INVENTOR
William A. Ray
BY John Flam
ATTORNEY

June 20, 1950
W. A. RAY
AUTOMATIC VALVE CONTROL FOR FLUID
SUPPLY IN BURNER SYSTEMS
2,512,173
Filed Oct. 5, 1946
4 Sheets-Sheet 2
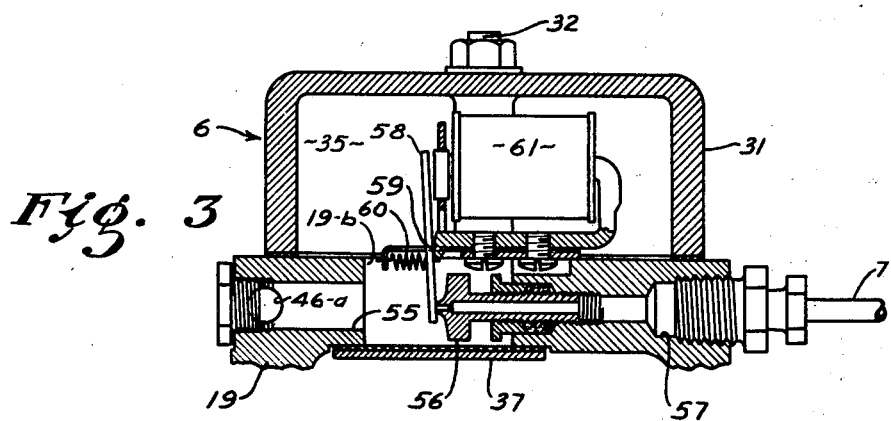
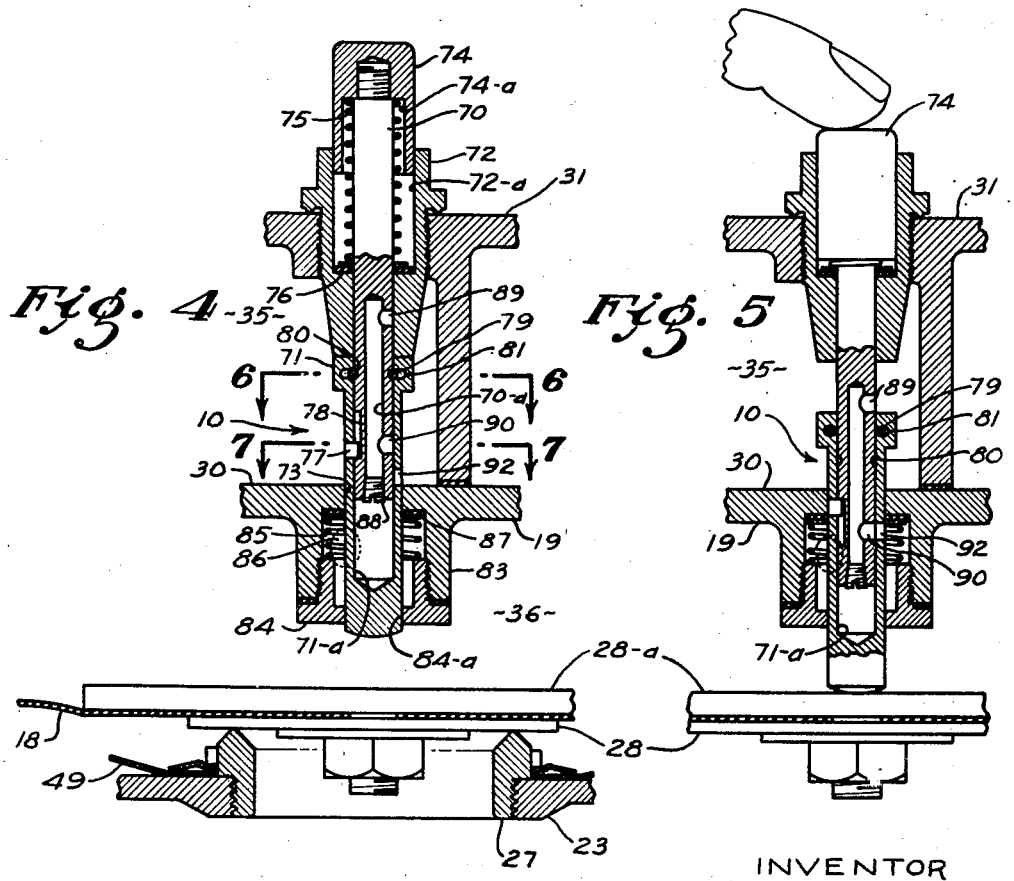
INVENTOR
William A. Ray
BY John Flann
ATTORNEY June 20, 1950

W. A. RAY

AUTOMATIC VALVE CONTROL FOR FLUID
SUPPLY IN BURNER SYSTEMS 2,512,173

Filed Oct. 5, 1946

INVENTOR
William A. Ray
BY John Flam
ATTORNEY

WILLIAM A. RAY, INVENTOR.

Patented June 20, 1950

2,512,173

UNITED STATES PATENT OFFICE 2,512,173

AUTOMATIC VALVE CONTROL FOR FLUID SUPPLY IN BURNER SYSTEMS

William A. Ray, North Hollywood, Calif., assignor to General Controls Co., a corporation of California Application October 5, 1946, Serial No. 701,485

24 Claims. (Cl. 158—117.1)

This invention relates to an automatic control valve for fluid fuel supply systems.

In a patent issued to William A. Ray on September 1, 1942, and numbered 2,294,693, a valve is disclosed and claimed for controlling the fuel flow to a main burner, a minute electric current from a thermocouple heated by the flame of the pilot burner being used to operate the valve. When the pilot flame is in existence, a control valve is operated, causing the fluid pressure of the fuel to move the valve closure to open position and to remain open, subject to a thermostat or other conventional limit switch. Upon failure of the pilot flame, the valve automatically closes and cannot be opened until the pilot flame has been re-established. However, with such a valve, the flow of fuel from the pilot burner continues after flame failure, which is undesirable and may create a dangerous condition.

It is an object of this invention to provide a valve of the above type arranged to provide 100% shut-off of the fuel upon failure of the pilot flame.

In order to re-establish the pilot flame and restore the system to operation, means must be provided for optionally passing fuel to the pilot burner after closure of the automatic valve. It is, accordingly, another object of this invention to provide an automatic 100% shut-off valve having improved means for passing fuel to the pilot burner to permit re-establishment of the pilot flame.

Before re-establishing the pilot flame, prevention of fuel flow to the main burner must be assured to guard against possible injury to the operator or to the system. It is another object of this invention to provide a valve wherein operation of the means to pass fuel to the pilot burner after flame failure serves first to ensure that fuel flow to the main burner is prevented.

It is still another object of this invention to provide a compact unitary valve structure for controlling fuel flow to a main burner and to a pilot burner in accordance with the existence of the pilot flame, and having novel means for passing fuel to the pilot burner to permit re-establishment of the pilot flame after flame failure.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

In the drawings:

Fig. 3 is a fragmentary transverse sectional view, taken as indicated by lines 3—3 on Fig. 2;

Fig. 4 is a fragmentary transverse sectional view, partly in elevation and on an enlarged scale, taken as indicated by lines 4—4 on Fig. 2;

Fig. 5 is a view, similar to Fig. 4, showing a different operating position of the parts;

Figure 9:
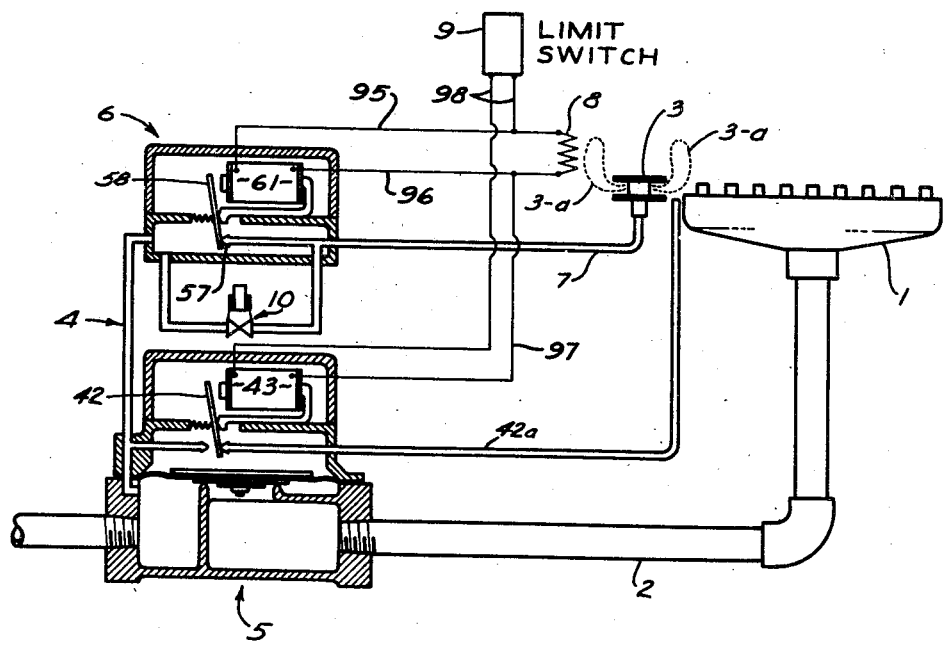
Fig. 9 is a schematic view showing a system incorporating the valve.
Figure 10:
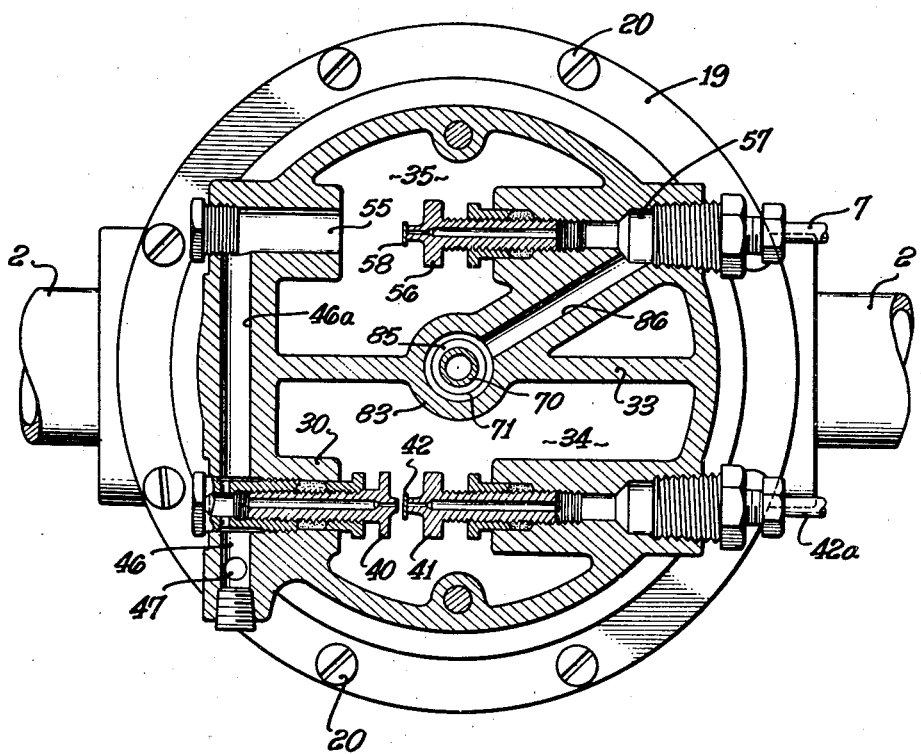
Fig. 10 is a cross-section, taken as indicated by lines 10—10 on Fig. 1.

Referring to Fig. 9 of the drawings, a system is shown adapted for gaseous fuel and comprises a main burner 1 connected to a suitable source of fuel supply by a conduit 2, and a pilot burner 3 providing a normally burning pilot flame 3—a. The valve structure of the invention, generally indicated by the numeral 4, is interposed in the conduit 2 and includes a main valve structure 5 for controlling fuel flow to the main burner 1, and a pilot burner valve structure 6 for controlling fuel flow via conduit 7 to the pilot burner 3.

The pilot flame 3—a serves to energize a thermocouple structure 8 and to ignite the main burner 1 when fuel is supplied thereto. The valve structures 5 and 6 are electromagnetically controlled, the arrangement being such that, when the pilot flame 3—a is burning, current from the thermocouple 8 will cause the pilot burner valve 6 to open and remain open, maintaining the fuel supply to the pilot burner 3.

A limit switch 9, which may be, for example, a thermostat or a clock controlled switch, or both, serves to control passage of current from the thermocouple 8 to the main valve structure 5. When the switch 9 calls for heat, the thermocouple current will operate the valve 5 to open and to maintain it open, supplying fuel to the main burner 1. When the demands of the switch 9 are satisfied, the passage of current to the valve 5 will be interrupted, causing the valve 5 to be closed until heat is called for again by the switch 9. This is the normal operation of the system.

Upon extinguishment of the pilot flame, the thermocouple 8 is de-energized, causing valve 6 to close and valve 5, if open, to be closed, preventing all flow of fuel to the burners 3 and 1 and effecting a complete shut-off. To permit reestablishment of the pilot flame and restoration of the system to normal operation, a by-pass valve 10 is provided for optional operation to pass fuel to the pilot burner 3 independently of the valve 6. When the pilot flame 3—a is burning again, valve 6 re-opens and the valve 10 is allowed to close, the system now being restored to normal operation. An important feature of the valve structure 4 is the provision of means whereby operation of the valve 10 serves to ensure that the main valve 5 is closed before fuel is passed to the pilot burner.

The valve 4 is a unitary structure comprising a lower body portion 15 (Fig. 1), which may be formed conveniently as a casting, and which has a large, upwardly directed circular opening 16 surrounded by a flat annular surface 17 of the casting. The opening 16 is closed by a flexible diaphragm 18 formed of neoprene, or other suitable material, clamped on the surface 17 by the intermediate body section 19 which is secured to the body portion 15 by a plurality of machine screws 20.

The space within the body portion 15 is divided into an inlet chamber 21 and an outlet chamber 22 by a ported partition wall 23. The body portion 15 has oppositely directed threaded openings 25 and 26 which communicate respectively with the inlet and outlet chambers 21 and 22 and enable connection of the body with the conduit 2.

Figure 1:
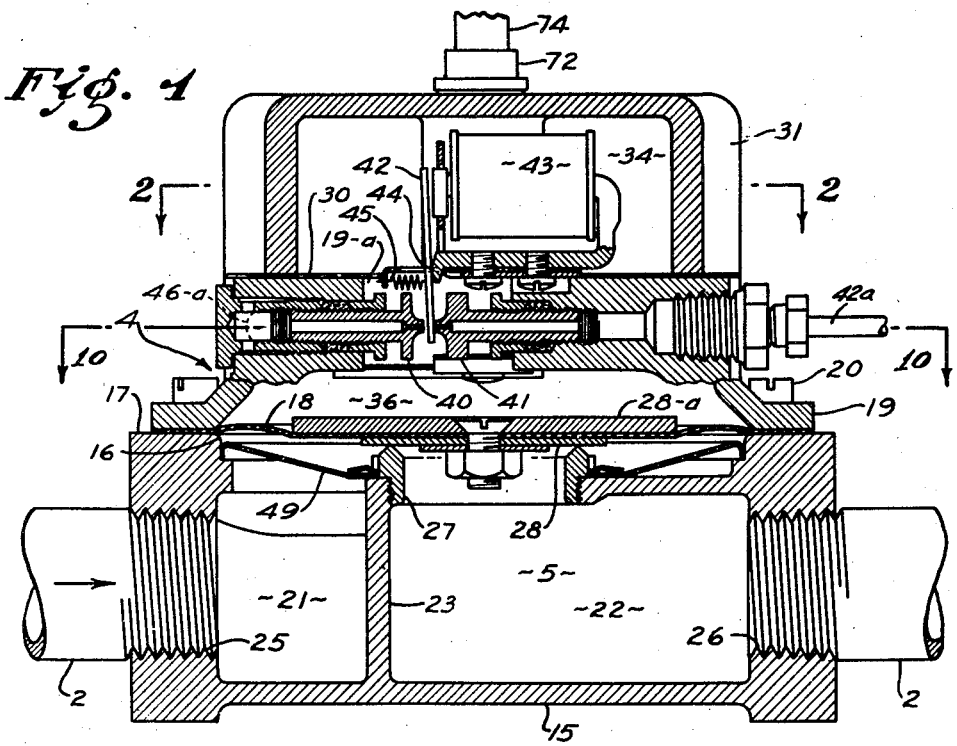
Figure 1 is a transverse sectional view of a valve incorporating the features of the invention, the upper portion of the figure being taken as indicated by lines 1—1, the lower portion of the figure being taken as indicated by lines 1-a—1-a on Fig. 2.

The port in the wall 23 is provided with a removable valve seat 27 (Figs. 1 and 4). A closure member 28 is appropriately supported by the diaphragm 18 for movement toward and away from the valve seat 27 and thus serves to control fluid flow between the inlet and outlet chambers 21 and 22. A disc 28—a of substantial weight may be attached to the upper side of diaphragm 18.

The intermediate body section 19 has an upper wall 30 providing a face to which an inverted cup-like member 31, forming the top body section, is secured, as by bolts 32 (Fig. 2) in a fluid-tight manner. As clearly shown in Fig. 2, the member 31 has a transverse wall 33 dividing the interior of the member into compartments 34 and 35. Compartment 34 is in free communication with the space 36 within the body section 19 above the diaphragm 18 through the opening 19—a in the section 19 (see Figs. 1 and 2). The space 36 and compartment 34 thus form an expansible chamber in accordance with the movement of the diaphragm 18.

A similar opening 19—b (Figs. 2 and 3) leads downwardly through the body section 19 from the other compartment 35, but is closed in a fluid-tight manner by a plate 37 secured to section 19, so that the compartment 35 is isolated from the space 36 (see Fig. 3).

The fluid pressure of the fuel in the inlet chamber 21 (Fig. 1) on the annular surface on the underside of the diaphragm 18 about the seat 27 will create a force urging the diaphragm 18 upwardly to unseat the closure 28. Further, if such fluid pressure is present in the chamber 34, 36, it will act on the entire area of the upper side of the diaphragm 18 in opposition to such force. Thus, by appropriately controlling the pressure conditions in the chamber 34, 36, the closure 28 may be operated to open and to close.

Figure 8:
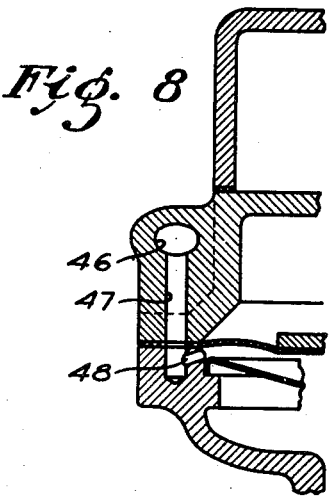
Fig. 8 is a fragmentary sectional view, taken as indicated by lines 8—8 on Fig. 2.
Figure 6:
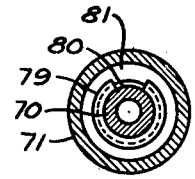
Figs. 6 and 7 are detail sections, taken as indicated by correspondingly numbered lines on Fig. 4.
Figure 7:
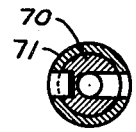

Such control means includes an inlet nozzle 40 and a vent nozzle 41 controlled by a common closure 42 operated by an electromagnet 43. The closure 42 is provided intermediate its ends at 44, which is a knife-edge formed on a portion of the magnetic circuit for magnet 43. Closure 42 is biased by a compression spring 45 to close the vent nozzle 41 when magnet 43 is de-energized, the inlet nozzle 40 thus being open. This nozzle is in continuous communication with the inlet chamber 21 by ports 46, 47 and 48 (see Figs. 2 and 8). Thus, when the magnet 43 is de-energized, the fluid pressure of the fuel is admitted to the expansible chamber 34, 36 and maintains the valve closure 28 seated.

When magnet 43 is energized, the closure 42 is swung about its pivot 44 to close the nozzle 40 and open the vent nozzle 41, allowing the fuel to pass to the atmosphere through the vent conduit 42a. This releases the pressure from the chamber 34, 36, allowing the closure 28 to move to open position. To guard against entry of foreign matter which might prevent proper operation of the closures 28, 42, etc., the inlet chamber 21 is provided with a fine mesh screen 49 through which the fuel must pass on entering the valve.

A fuel control valve of this type is disclosed and claimed in the previously mentioned Patent No. 2,294,693, and the particular structure of the nozzles 40, 41 may be the same as that shown in said patent.

The valve means comprising nozzles 40, 41, closure 42, magnet 43, etc., serves to control the main valve closure 28. The valve 6 for controlling fuel flow to the pilot burner 3 is arranged quite similarly.

Figure 2:
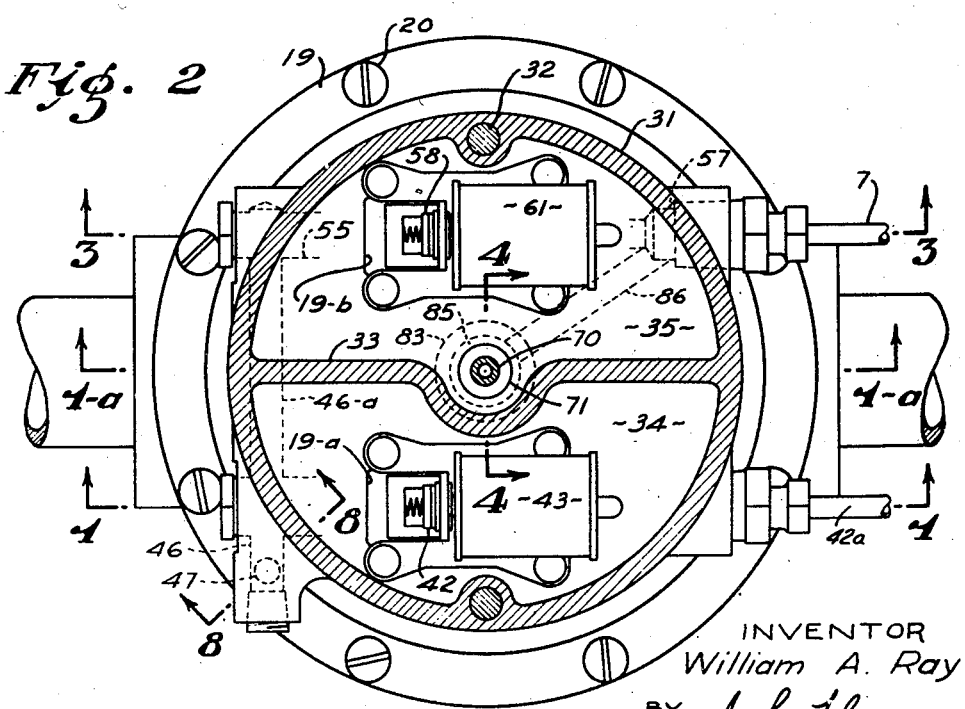
Fig. 2 is a cross section, taken as indicated by lines 2—2 on Fig. 1.

Referring to Figs. 2 and 3, the port 46 has an extension 46—a which connects with the compartment 35 through an opening 55 so that the compartment is in free communication at all times with the inlet chamber 21. A nozzle 56 provides an opening leading from the compartment 35 to a supplemental outlet 57 which is connected with the pilot burner 3 by the conduit 7.

A closure 58 is provided for the nozzle 56, and may be substantially identical with the closure 42 of the control valve, being pivotally supported at a point 59 intermediate its ends. A light compression spring 60 biases the closure 58 to nozzle-closing position, an electromagnet 61 serving, when energized, to swing the closure 58 to open position and to maintain it open. Thus, as long as the electromagnet 61 is energized, fuel passes from the inlet chamber 21 to the supplemental outlet 57, and thence to the pilot burner 3. When the magnet 61 is de-energized, the closure 58 seats and the fuel flow is stopped.

The means shown as comprising the valve means 10, for passing fuel to the pilot burner 3 independently of energization of the electromagnet 61, will now be described, reference for this purpose being had to Figs. 2, 4, 5, 6, and 7. Although the main valve closure 28 is arranged to move automatically to closed position whenever the pilot flame is extinguished, the valve means 10 is arranged to exert a force ensuring that the closure 28 is seated before passing fuel to the pilot burner.

Referring to Fig. 4, a pair of tubular members 70 and 71, assembled in telescopic relationship, are guided for movement axially of the closure 28 by a bushing 72 threaded through the top wall of the member 31, and by an aperture 73 in the top wall 30 of the intermediate body section 19. The inner member 70 extends upwardly through the bushing 72 and has a head or finger button 74 threadedly secured on its upper end. This head 74 is freely slidable in a counter-bore 72—a formed in the bushing 72, and has a counter-bore 74—a for accommodating a compression spring 75. This spring 75 rests on a packing washer 76 formed of neoprene, for example, seated in the bottom of the counter-bore 72—a, and which serves to prevent leakage of fuel past the member 70. The spring 75 acts resiliently to urge the members 70 and 71 to their upper positions.

The outer member 71 is secured on member 70 against angular movement, but for limited axial movement with respect thereto, by a lost motion connection comprising a pin 77 secured in the member 71 and engaging a slot 78 formed in the member 70. The members 70 and 71 are releasably restrained against relative axial movement by a resilient split ring 79 engaging normally aligned annular grooves 80 and 81, formed respectively in the members 70 and 71. One of the grooves, for example the groove 81, has a depth exceeding the width of the stock of which the ring 79 is formed, so that, upon application of sufficient force urging relative movement between the members 70 and 71, the ring 79 will be forced out of the groove 80 into the grove 81, freeing the members for relative movement.

The member 72 extends downwardly through a hollow boss 83 provided on the underside of the wall 30, and thence into the chamber 36. The boss 83 is closed at its lower end by a threaded cap 84 to form a chamber 85 which is in continuous communication with the supplemental outlet 57 by means of a passage 86 in wall 30 (see, particularly, Fig. 2). The cap 84 has an opening 84—a for accommodating the member 71, a spring-pressed packing ring 87 being provided to prevent fuel leakage past the member 71 into the chamber 85.

The inner member 70 has an axially extending bore 70—a in its lower portion, closed at its lower end as by a plug 88 and intersected by spaced radial ports 89 and 90. The outer member 71 has an axially extending bore 71—a for slidingly accommodating the member 70 as previously discussed, which bore is closed at its lower end and is intersected by a radial port 92.

The normal relative positions of the parts, that is, when no pressure is exerted on the finger button 74, are as shown in Fig. 4. The force of the spring 75 urges the member 70 upwardly with respect to the member 71 until the lower end of slot 78 engages the pin 77, whereupon the members 70 and 71 move upwardly together until stopped by the engagement of the upper end of member 71 and the lower end of the bushing 72. Additionally, the grooves 80 and 81 are aligned so that the spring ring 79, by engaging both grooves, releasably locks the members 70 and 71 together. In this normal position the lower end of the member 71 is spaced sufficiently above the closure 28 to allow free operation of the closure, and passage of fuel from compartment 35 to the supplemental outlet 57 is prevented.

Upon exertion of appropriate pressure on the finger button 74, the members 70 and 71 move downwardly as a unit, since they are locked together by the spring ring 79, until member 71 contacts the closure 28. If the closure 28 happens to be unseated, the movement continues until a definite stop is provided by the closure 28 engaging seat 27. Thereupon, the ring 79 is forced out the groove 80, releasing the member 70 for downward movement in the member 71 until checked by the engagement of the upper end of slot 78 with pin 77.

All parts are now in the relative positions of Fig. 5; ports 90 and 92 are in alignment, and port 89 is open into compartment 35. Thus, fuel can flow from the compartment 35 into passage 86, via port 89, bore 70—a, ports 90 and 92, and handle 85, and thence through conduit 7 to the pilot burner 3.

Upon release of the pressure on the button 74, the spring 75 returns all parts to the initial positions of Fig. 4, as previously described.

Referring again to the system of Fig. 9, the electromagnet 61 is connected by leads 95 and 96 to the thermocouple structure 8. Thus, whenever the pilot flame 3—a is in existence, the magnet 61 is energized and the valve 6 is maintained open. The electromagnet 43 is also connected to the thermocouple structure 8 by leads 97 and 98, the limit switch 9 being interposed in one of the leads as 98. Thus, as long as the pilot flame 3—a is in existence, the electromagnet 43 is energized and de-energized to cause the main valve 5 to open and close in accordance with the requirements of the limit switch 9. Upon pilot flame failure, magnet 61 and magnet 43, if energized, will be de-energized, thus valves 5 and 6 both will be closed.

Accordingly, in order to initiate operation of the system, the button 74 is depressed to the position of Fig. 5; then the pilot burner 3 is ignited. After a few seconds, the button 74 may be released, the thermopile 8 then being active to open fuel passage 57.

The inventor claims:

1. In a valve control system: a first power operated valve having a seat and a closure engageable therewith; a second power operated valve operable between open and closed positions; and a manually operated by-pass valve structure for passing fluid around said second valve when said second valve is closed, and including instrumentalities operatively associated with said first valve for first holding said closure positively on its seat and then opening said by-pass valve structure.

2. In a valve control system: a first power operated valve having a seat and a closure engageable therewith; a second power operated valve operable between open and closed positions; and a manually operated by-pass valve structure for passing fluid around said second valve when said second valve is closed, comprising a stem having relatively movable parts; and means yieldingly restraining the parts from relative movement, said stem having an extension operatively associated with said closure for holding the closure positively on its seat upon movement of the stem to by-pass valve structure opening position and prior to opening of said by-pass valve structure.

3. In a valve control system: a first power operated valve having a seat and a closure engageable therewith; a second power operated valve operable between open and closed positions; and a manually operated by-pass valve structure for passing fluid around said second valve when said second valve is closed, comprising a stem having relatively movable parts; means yieldingly restraining the parts from relative movement, said stem having an extension operatively associated with said closure for holding the closure positively on its seat upon movement of the stem to by-pass valve structure opening position and prior to opening of said by-pass valve structure; and means resiliently urging the stem to inactive position.

4. In a fuel flow control system: a main burner; a pilot burner for providing a pilot flame to ignite the main burner; a main valve for controlling fuel flow to the main burner, said main valve being normally biased to closed position; means responsive to the existence of a pilot flame for operating said main valve to open position; a pilot burner valve for controlling fuel flow to the pilot burner; means responsive to the existence of a pilot flame for operating said pilot burner valve to open position; and optionally operable means for preventing fuel flow to the main burner and for causing fuel to pass to the pilot burner to enable establishment of a pilot flame.

5. In a fuel flow control system: a main burner; a pilot burner for providing a pilot flame to ignite the main burner; a main valve for controlling fuel flow to said main burner, said main valve being normally biased to closed position; means responsive to the existence of a pilot flame for operating said main valve to open position; a pilot burner valve for controlling fuel flow to the pilot burner; means responsive to the existence of a pilot flame for operating said pilot burner valve to open position; and optionally operable means for preventing fuel flow to the main burner and for by-passing said pilot burner valve to enable establishment of a pilot flame.

6. In a fuel flow control system: a main burner; a pilot burner for providing a pilot flame to ignite the main burner; a main valve having a through passageway for passing fuel to said main burner and a closure for controlling said passageway, said closure being normally urged to closed position; means responsive to the existence of a pilot flame for operating said closure to open position; a pilot burner valve for passing fuel to the pilot burner; means responsive to the existence of a pilot flame for operating said pilot burner valve to open position; optionally operable means for causing fuel to pass to the pilot burner to enable establishment of a pilot flame; and means actuated by operation of said optionally operable means for positively locating said closure in its closed position before fuel is passed to the pilot burner.

7. In a fuel flow control system: a main burner; a pilot burner for providing a pilot flame to ignite the main burner; a main valve having a through passageway for passing fuel to said main burner and a closure for controlling said passageway, said closure being normally urged to closed position; means responsive to the existence of a pilot flame for operating said closure to open position; a pilot burner valve for passing fuel to the pilot burner; means responsive to the existence of a pilot flame for operating said pilot burner valve to open position; an optionally operable member for shifting said closure to closed position; and means for causing fuel to pass to the pilot burner upon movement of said member to closure closing position.

8. In a fuel flow control system: a main burner; a pilot burner for providing a pilot flame to ignite the main burner; a main valve having a through passageway for passing fuel to said main burner and a closure for controlling said passageway, said closure being normally urged to closed position; means responsive to the existence of a pilot flame at said pilot burner for operating said closure to open position; a pilot burner valve for passing fuel to the pilot burner; means responsive to the existence of a pilot flame at said pilot burner for operating said pilot burner valve to open position; and optionally operable means for preventing fuel flow to the main burner and for by-passing fuel past the pilot burner valve to enable establishment of the pilot flame.

9. In a fuel flow control system: a main burner; a pilot burner for providing a pilot flame to ignite the main burner; a main valve having a through passageway for passing fuel to said main burner and a closure for controlling said passageway, said closure being normally biased to closed position; means responsive to the existence of a pilot flame for operating said closure to open position; a pilot burner valve for passing fuel to the pilot burner; means responsive to the existence of a pilot flame for operating said pilot burner valve to open position; means forming a passageway by-passing said pilot burner valve; an optionally operable member for shifting said closure to closed position; and valve means cooperating with said member for opening said by-pass passageway upon movement of said member to closure closing position.

10. In a fuel flow control system: a main burner; a pilot burner for providing a pilot flame to ignite the main burner; a main valve having a through passageway for passing fuel to the main burner; a movable closure for controlling said passageway, and means forming an expansible chamber for operating said closure to open and to close in accordance with the fluid pressure of the fuel; a control valve responsive to the existence of a pilot flame for varying the pressure in said chamber to operate said closure; a pilot burner valve for passing fuel to the pilot burner; means responsive to the existence of a pilot flame for operating said pilot burner valve to open position; optionally operable means for causing fuel to pass to the pilot burner to enable establishment of a pilot flame; and means actuated by operation of said optionally operable means for positively locating said closure in its closed position before fuel is passed to the pilot burner.

11. In a fuel flow control system: a main burner; a pilot burner for providing a pilot flame to ignite the main burner; a main valve having a through passageway for passing fuel to the main burner; a movable closure for controlling said passageway, and means forming an expansible chamber for operating said closure to open and to close in accordance with the fluid pressure of the fuel; a control valve responsive to the existence of a pilot flame for varying the pressure in said chamber to operate said closure; a pilot burner valve for passing fuel to the pilot burner; means responsive to the existence of a pilot flame for operating said pilot burner valve to open position; an optionally operable member for positively locating said closure in closed position; and means for causing fuel to pass to the pilot burner upon movement of said member to closure closing position.

12. In a fuel flow control system: a main burner; a pilot burner for providing a pilot flame to ignite the main burner; a main valve having a through passageway for passing fuel to the main burner; a movable closure for controlling said passageway, and means forming an expansible chamber for operating said closure to open and to close in accordance with the fluid pressure of the fuel; a control valve responsive to the existence of a pilot flame for varying the pressure in said chamber to operate said closure; a pilot burner valve for passing fuel to the pilot burner; means responsive to the existence of a pilot flame for operating said pilot burner valve to open position; and optionally operable means for preventing fuel flow to the main burner and for by-passing the pilot burner valve to enable establishment of the pilot flame.

13. In a fuel flow control system: a main burner; a pilot burner for providing a pilot flame to ignite the main burner; a main valve having a through passageway for passing fuel to the main burner; a movable closure for controlling said passageway, and means forming an expansible chamber for operating said closure to open and to close in accordance with the fluid pressure of the fuel; a control valve responsive to the existence of a pilot flame for varying the pressure in said chamber to operate said closure; a pilot burner valve for passing fuel to the pilot burner; means responsive to the existence of a pilot flame for operating said pilot burner valve to open position; means forming a passageway by-passing said pilot burner valve; an optionally operable member for positively locating said closure in closed position; and valve means co-operating with said member for opening said by-pass passageway upon movement of said member to closure closing position.

14. In a valve structure for fluid fuels: a valve body having a main flow passage, as well as a supplemental flow passage therethrough, each of said passages having an inlet and an outlet; a closure for each of said passages; means including electro-responsive operators for independently controlling the movements of said closures between open and closed positions; means optionally operable to cause fuel to pass to the outlet of said supplemental passage independently of the electro-responsive operator; and means whereby operation of the said means causing fuel to pass to the supplemental outlet locates the closure for the main flow passage in its closed position before fuel is caused to pass.

15. In a valve structure for fluid fuels: a valve body having a main flow passage, as well as a supplemental flow passage therethrough, each of said passages having an inlet and an outlet; a closure for each of said passages; electro-responsive means for independently controlling the movements of said closures between open and closed positions; means forming a by-pass passageway for passing fuel to the outlet of said supplemental passage when the supplemental passage closure is closed; valve means controlling said passageway, including an operating member; and means whereby movement of said operating member in valve opening direction locates the closure for the main flow passage in its closed position before fuel is passed to the supplemental passage outlet.

16. In a valve structure for fluid fuels: a valve body having a main flow passage, as well as a supplemental flow passage therethrough, each of said passages having an inlet and an outlet; a closure for each of said passages; means including electro-responsive operators for independently controlling the movements of said closures between open and closed positions; and means optionally operable to cause fuel to pass to the outlet of said supplemental passage independently of the electro-responsive operator, comprising a movable member adapted to urge the closure for the main flow passage to closed position, said optionally operable means including means responsive to the arrival of said member in closure closing position for causing fuel to pass.

17. In a valve structure for fluid fuels: a valve body having a main flow passage, as well as a supplemental flow passage therethrough, each of said passages having an inlet and an outlet; a closure for each of said passages; electro-responsive means for independently controlling the movements of said closures between open and closed positions; means forming a by-pass passageway for passing fuel to the outlet of said supplemental passage when the supplemental passage closure is closed; valve means controlling said passageway, including a pair of relatively axially movable telescopically disposed tubular elements having ports respectively in their walls; means releasably restraining said elements against relative movement whereby initial movement of one element causes said elements to move as a unit and urge the closure for the main flow passage to closed position, arrival of said closure in closed position preventing further movement of the other element, continued movement of said one element thereafter serving to align said ports to permit fluid flow through the valve means.

18. In a valve structure for fluid fuels: a valve body having a main flow passage; a movable closure for controlling said passage; means forming an expansible chamber for operating said closure to open and to close; means including an electro-responsive operator for causing the fluid pressure of the fuel to act in said chamber to operate the closure; there being a supplemental flow passage through said body, having an outlet; means including an electro-responsive operator for controlling fuel flow to said outlet; means optionally operable to cause fuel to pass to said outlet independently of the electro-responsive operator; and means whereby operation of the said means causing fuel to pass to the supplemental outlet locates said closure in its closed position before fuel is passed.

19. In a valve structure for fluid fuels: a valve body having a main flow passage; a movable closure for controlling said passage; means forming an expansible chamber for operating said closure to open and to close; means including an electro-responsive operator for causing the fluid pressure of the fuel to act in said chamber to operate the closure; there being a supplemental flow passage through said body, having an outlet; means including an electro-responsive operator for controlling fuel flow to said outlet; means forming a passageway for passing fuel to said outlet independently of the means, including an electro-responsive operator; valve means controlling said passageway, including an operating member; and means whereby movement of said operating member in valve opening direction locates said closure in its closed position before fuel is passed to said outlet.

20. In a valve structure: a first valve having a seat, and a closure for the seat; a second valve; and a manually operated valve structure for by-passing the second valve, comprising a pair of telescoping members, one member having a port capable of alignment with a port in the other member; means limiting relative movement of the members in positions corresponding to one in which the ports are out of alignment and one in which the ports are in alignment; and a yielding restraint holding the members in out-of-alignment position; one of said members having an extension for holding the closure on its seat upon movement of the other member toward the position in which the ports would be in alignment.

21. In a valve structure: a first valve having a seat, and a closure for the seat; a second valve; and a manually operated valve structure for by-passing the second valve, comprising a linearly movable member having a pair of relatively movable parts; a yielding restraint holding said parts in one position in which said by-passing valve is closed; one of said parts having an end movable into engagement with the closure for holding the closure on its seat while the other part moves relatively to said one part to open said by-passing valve.

22. In a valve control system: a first power operated valve having a seat and a closure engageable therewith; a second power operated valve operable between open and closed positions; and a manually operated by-pass valve structure for passing fluid around said second valve when said second valve is closed, and including instrumentalities normally disengaged from said closure and movable into engagement with said closure to first hold the closure on its seat and then open said by-pass valve structure.

23. In a fuel flow control system: a main burner; a pilot burner for providing a pilot flame to ignite the main burner; a main valve for controlling fuel flow to the main burner, said main valve being normally biased to closed position; means responsive to the existence of a pilot flame for operating said main valve to open position; a pilot burner valve for controlling fuel flow to the pilot burner; means responsive to the existence of a pilot flame for operating said pilot burner valve to open position; and optionally operable means operatively associated with said main valve for closing said main valve and for causing fuel to pass to the pilot burner to enable establishment of a pilot flame at the pilot burner.

24. In a fuel flow control system: a main burner; a pilot burner for providing a pilot flame to ignite the main burner; a main valve having a through passageway for passing fuel to said main burner and a closure for controlling said passageway, said closure being normally urged to closed position; means responsive to the establishment of a pilot flame at said pilot burner for operating said closure to open position; a pilot burner valve for passing fuel to the pilot burner; means responsive to the existence of a pilot flame at said pilot burner for operating said pilot burner valve to open position; and optionally operable means operatively associated with said main valve for closing said main valve and for by-passing fuel past the pilot burner valve to enable establishment of the pilot flame.

WILLIAM A. RAY.

REFERENCES CITED

The following references are of record in the file of this patent:

UNITED STATES PATENTS

| Number | Name | Date |
| --- | --- | --- |
| 2,271,506 | Mantz | Jan. 27, 1942 |
| 2,288,417 | Paille | June 30, 1942 |
| 2,297,854 | Alfery | Oct. 6, 1942 |
| 2,299,649 | Paille | Oct. 20, 1942 |
| 2,309,709 | Paille | Feb. 2, 1943 |
| 2,371,351 | Paille | Mar. 13, 1945 |